US008924520B2

(12) United States Patent
Wu et al.

(10) Patent No.: US 8,924,520 B2
(45) Date of Patent: Dec. 30, 2014

(54) METHOD, REMOTE ACCESS SERVER AND SYSTEM FOR CONFIGURING A QUALITY OF SERVICE PARAMETER

(75) Inventors: Huangwei Wu, Shenzhen (CN); Yu Zhu, Shenzhen (CN); Qinliang Zhang, Shenzhen (CN); Ping Fang, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 377 days.

(21) Appl. No.: 13/411,284

(22) Filed: Mar. 2, 2012

(65) Prior Publication Data
US 2012/0166600 A1 Jun. 28, 2012

Related U.S. Application Data

(63) Continuation-in-part of application No. PCT/CN2010/074361, filed on Jun. 24, 2010.

(30) Foreign Application Priority Data

Sep. 2, 2009 (CN) .......................... 2009 1 0167279

(51) Int. Cl.
*G06F 15/177* (2006.01)
*G06F 15/16* (2006.01)
*H04L 12/915* (2013.01)
*H04L 12/28* (2006.01)
*H04L 12/927* (2013.01)

(52) U.S. Cl.
CPC .......... *H04L 47/785* (2013.01); *H04L 12/2832* (2013.01); *H04L 47/805* (2013.01); *H04L 12/2825* (2013.01)
USPC .......................................... 709/220; 709/228

(58) Field of Classification Search
CPC .............. H04L 29/06; H04L 29/08072; H04L 29/08981; H04L 29/0809
USPC .................................................. 709/219, 220
See application file for complete search history.

(56) References Cited

U.S. PATENT DOCUMENTS 8,024,429 B2 * 9/2011 Cagenius ...................... 709/219
8,050,282 B2 * 11/2011 Cho et al. ..................... 370/401
(Continued)

FOREIGN PATENT DOCUMENTS

JP          2004531180 A    10/2004
WO     WO 2008040617 A1   4/2008
(Continued)

OTHER PUBLICATIONS

Seepold, et al. (2007). Multimedia service management for home networks with end to end quality of service. In Managing Next Generation Networks and Services (pp. 531-534). Springer Berlin Heidelberg.*

(Continued)

*Primary Examiner* — Lynn Feild
*Assistant Examiner* — Timothy Sowa
(74) *Attorney, Agent, or Firm* — Leydig, Voit & Mayer, Ltd.

(57) ABSTRACT

A method, a remote access server and a system for configuring a QoS parameter are provided. In the method, the RAS and the system, when performing QoS configuration, a first network sends data traffic description information of a data traffic to be transmitted to a second network, so that the second network may perform QoS configuration of the second network according to the data traffic description information; and after completing local configuration, an RAS of the first network directly returns a configuration completion response to a QoS management device of the first network without waiting for a configuration completion message returned by the second network, so that the QoS management device of the first network continues performing the QoS configuration of the first network, thereby achieving parallel QoS configuration of the first network and the second network, reducing the delay of the QoS configuration.

17 Claims, 6 Drawing Sheets

(56) References Cited

U.S. PATENT DOCUMENTS

| | | | |
|---|---|---|---|
| 8,305,893 B2 * | 11/2012 | Verma et al. | 370/231 |
| 8,375,104 B2 * | 2/2013 | Cho et al. | 709/219 |
| 8,438,218 B2 * | 5/2013 | Han et al. | 709/203 |
| 2003/0005130 A1 | 1/2003 | Cheng | |
| 2007/0211632 A1 | 9/2007 | Song et al. | |
| 2007/0253427 A1 | 11/2007 | Stirbu | |
| 2008/0140842 A1 | 6/2008 | Kwang et al. | |
| 2010/0094954 A1 * | 4/2010 | Han et al. | 709/219 |
| 2010/0095002 A1 | 4/2010 | Viger et al. | |
| 2011/0320572 A1 * | 12/2011 | Damola | 709/219 |
| 2013/0132524 A1 * | 5/2013 | Cho et al. | 709/219 |

FOREIGN PATENT DOCUMENTS

| | | |
|---|---|---|
| WO | WO 2008/088259 A1 | 7/2008 |
| WO | WO 2008088259 A1 | 7/2008 |
| WO | WO 2009/025460 A2 | 2/2009 |

OTHER PUBLICATIONS

UPnP Forum. (2008). UPnP QosDevice:3. Wade (Ed.), et al. Retrieved from http://upnp.org/specs/qos/UPnP-qos-QosDevice-v3-Service.pdf.*

UPnP Forum. (2008). UPnP QosPolicyHolder:3. Bhagwat (Ed.), et al. Retrieved from http://upnp.org/specs/qos/UPnP-qos-QosPolicyHolder-v3-Service.pdf.*

1st Office Action in corresponding European Patent Application No. 10813289.5 (Apr. 9, 2013).

1st Office Action in corresponding Korean Patent Application No. 10-2012-7007507 (Jul. 3, 2013).

1st Office Action in corresponding Japanese Patent Application No. 2012-527187 (Aug. 14, 2013).

1st Office Action in corresponding Chinese Patent Application No. 200910167279.1 (Dec. 5, 2012).

Written Opinion of the International Searching Authority in corresponding PCT Application No. PCT/CN2010/074361 (Sep. 30, 2010).

International Search Report in corresponding PCT Application No. PCT/CN2010/074361 (Sep. 30, 2010).

Brands et al., "Remote Access Architecture:2," Contributing Members of the UPnP™ Forum, for UPnP™ Version 1.0, Working Draft, Document Version 0.1, Service Template Version: 2.00 (Aug. 3, 2009) All Rights Reserved, Copyright © 2009.

Extended European Search Report in corresponding European Patent Application No. 10813289.5 (May 3, 2012).

Seepold et al., "Multimedia Service Management for Home Networks with End to End Quality of Service," Managing Next Generation Networks and Services, Oct. 2007, pp. 531-534, Springer, Heidelberg, Germany.

"XP-002674078—UPnP—QoS Architecture:3," Nov. 2008, http://www.upnp.org/specs/qos/UPnP-qos-Architecture-v3.pdf, UPnP Forum.

Presser et al., "UPnP™ Device Architecture 1.1," Revision, Contributing Members of the UPnP™ Forum (Oct. 15, 2008).

Russell et al., "Remote Access Architecture:1," For UPnP™ Version 1.0, Standardized DCP, Document Version 1.0, Service Template Version 2.00, Contributing Members of the UPnP™ Forum (Sep. 30, 2009).

* cited by examiner

METHOD, REMOTE ACCESS SERVER AND SYSTEM FOR CONFIGURING A QUALITY OF SERVICE PARAMETER

CROSS-REFERENCE TO RELATED APPLICATIONS

This application a continuation in part of International Application No. PCT/CN2010/074361, filed on Jun. 24, 2010, which claims priority to Chinese Patent Application No. 200910167279.1, filed with the Chinese Patent Office on Sep. 2, 2009 and entitled "METHOD, REMOTE ACCESS SERVER AND SYSTEM FOR CONFIGURING A QUALITY OF SERVICE PARAMETER", both of which are hereby incorporated by reference in their entireties.

BACKGROUND OF THE INVENTION

With the development of digital home, and the universal digitization of consumer electronic products, more and more digital entertainment devices and home appliance products are occurring in home. These home network devices are connected to form a home network in a wired or wireless manner, so as to achieve functions such as content sharing or mutual control, which is the digital home network concept that the industry is conceiving and striving to achieve.

In order to achieve interworking and control of various different home devices, more and more home network devices support Universal Plug and Play (Universal Plug and Play, UPnP). In a UPnP system, a user controls a home device through a control point (Control Point, CP) in the home network, and the control point adopts a UPnP protocol, reads status information of a UPnP device in the home network, and controls the UPnP device to execute a corresponding operation by invoking a control command (action) relevant to the UPnP device.

The UPnP defines a standard relevant to remote access (Remote Access, RA), which is used to perform remote access on a device in the home network when the home network device is moved out of the home network, such as upload/download of a media file, and remote control. The UPnP remote access further supports home-to-home (Home-to-Home, H2H) remote access, so as to achieve applications such as media content sharing of two home networks.

In order to improve remote access quality and user experience, establishment of Quality of Service (Quality of Service, QoS) between a local network and a remote network should be further considered. The UPnP defines a QoS standard, which is used to configure and establish QoS of a data traffic of a home network. However, the standard is only used in the home network, but cannot be applied to a remote network device for the remote access, and cooperative QoS configuration of two networks cannot be achieved in the remote access case, so that the remote access QoS and the user experience cannot be ensured technically.

SUMMARY OF THE INVENTION

The present invention is directed to a method, a remote access server and a system for configuring a Quality of Service parameter, which may achieve remote cooperative QoS configuration.

An embodiment of the present invention provides a method for configuring a Quality of Service parameter, which includes:

receiving, by a remote access server RAS of a first network, a QoS configuration request message sent by a Quality of Service QoS management device, where the configuration request message includes a QoS parameter configured for a data traffic by the QoS management device;

completing, by the RAS of the first network, QoS configuration according to the QoS parameter in the configuration request message and returning a response message to the QoS management device; and sending data traffic description information of the data traffic to a second network according to the QoS configuration request message, so that the second network performs QoS configuration of the second network with reference to the data traffic description information.

An embodiment of the present invention provides a remote access server, which includes:

a configuration request receiving unit, configured to receive a QoS configuration request message sent by a Quality of Service QoS management device, where the configuration request message includes a QoS parameter configured for a data traffic by the QoS management device;

a QoS configuration unit, configured to complete local QoS configuration according to the QoS parameter in the QoS configuration request message and return a response message to the QoS management device; and a transmitting unit, configured to send data traffic description information of the data traffic to a second network according to the QoS configuration request message received by the configuration request receiving unit, so that the second network performs QoS configuration of the second network with reference to the data traffic description information.

An embodiment of the present invention provides a remote access server, which includes:

an information receiving unit, configured to receive data traffic description information sent by an RAS of a first network; and a QoS parameter sending unit, configured to return a response message to the RAS of the first network, and send the data traffic description information to a QoS configuration device of a second network, so that the QoS configuration device of the second network performs QoS configuration of the second network according to the data traffic description information.

An embodiment of the present invention provides a system for configuring a Quality of Service parameter, which includes:

a control point, configured to receive user control, and send a data traffic QoS management request to a QoS management device;

the QoS management device, configured to receive a data traffic QoS management request message of the control point, where the data traffic QoS management request message includes data traffic description information of a transmitted data traffic; obtain all QoS devices in the first network involved in the data traffic transmission procedure according to the data traffic description information, and send a QoS configuration request to all the QoS devices, where the QoS devices include a remote access server RAS; and return a data traffic QoS management request response message to the control point after receiving configuration completion responses of all the QoS devices; and the remote access server, configured to receive a QoS configuration request message sent by the Quality of Service QoS management device, where the QoS configuration request message includes a QoS parameter configured for a data traffic by the QoS management device; complete QoS configuration according to the QoS parameter in the configuration request message and return a response message to the QoS management device; and send data traffic description information of the data traffic to a second network according to the QoS configuration request message, so that the second network performs QoS configuration of the second network with reference to the data traffic description information.

In the embodiments of the present invention, when performing QoS configuration, a first network sends data traffic description information of a data traffic to be transmitted to a second network, so that the second network may perform QoS configuration of the second network according to the data traffic description information, thereby achieving remote cooperative QoS configuration between home networks; and in the embodiments of the present invention, after completing local configuration, an RAS of the first network directly returns a configuration completion response to a QoS management device of the first network without waiting for a configuration completion message returned by the second network, so that the QoS management device of the first network continues performing the QoS configuration of the first network, thereby achieving parallel QoS configuration of the first network and the second network, reducing the delay of the QoS configuration, and improving the efficiency of the QoS configuration.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solutions of the present invention will be clearly and fully described in the following with reference to the accompanying drawings. It is obvious that the embodiments to be described are only a part rather than all of the embodiments of the present invention. All other embodiments obtained by persons of ordinary skill in the art based on the embodiments of the present invention without creative effects shall fall within the protection scope of the present invention.

Embodiment 1

Figure 1:
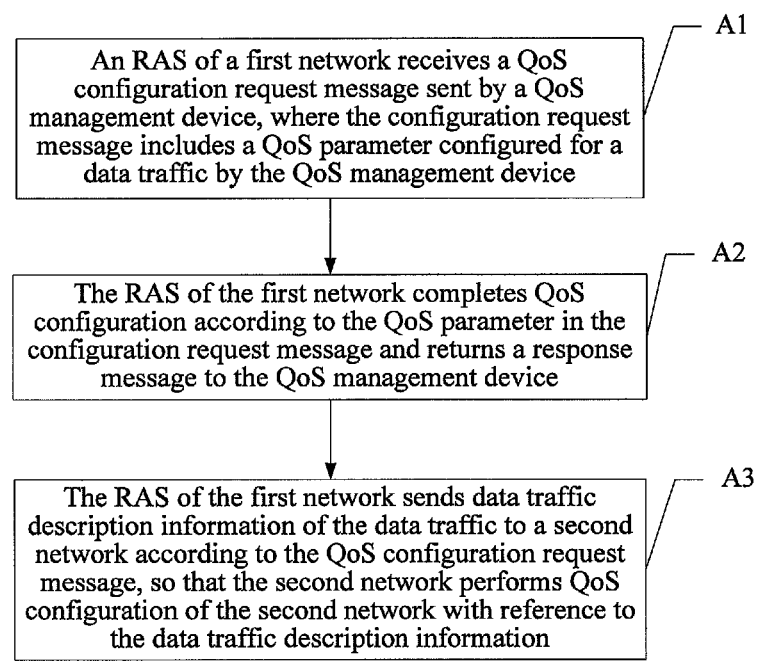
FIG. 1 is a flowchart of a method for configuring a Quality of Service parameter according to Embodiment 1 of the present invention.

A method for configuring a Quality of Service parameter, a flowchart of which is shown in FIG. 1, includes the following steps.

A1: A remote access server RAS of a first network receives a QoS configuration request message sent by a Quality of Service QoS management device (QoSManager, QM), where the configuration request message includes a QoS parameter configured for a data traffic by the QoS management device.

In this embodiment, the QoS parameter specifically includes: one or more of a data traffic level, a maximum data rate, a minimum data rate, a maximum jitter, and a maximum delay. It may be understood that, the QoS parameter may further include other parameters, and the specific parameters included in the QoS parameter do not limit the present invention. Data traffic description information may include: a source address, a destination address, a source port, a destination port, and a protocol number, that is, the generally described "quintuple", and may further include a QoS boundary source address (QosBoundarySourceAddress) and/or a QoS boundary destination address (QosBoundaryDestinationAddress). It may be understood that, the data traffic description information may further include other some description for data traffic attributes, such as a data traffic type, bandwidth information, a data traffic size, a coding manner, and a coding rate. The specific content included by the data traffic description information does not limit the present invention.

A2: The RAS of the first network completes QoS configuration according to the QoS parameter in the configuration request message and returns a response message to the QoS management device.

A3: The RAS of the first network sends data traffic description information of the data traffic to a second network according to the QoS configuration request message, so that the second network performs QoS configuration of the second network with reference to the data traffic description information.

In the embodiment of the present invention, no fixed logical sequence exists between step A2 and step A3, and in both step A2 and step A3, that the QoS configuration request message sent by the QoS management device is received in step A1 is regarded as a triggering condition. It may be understood that, in the embodiment of the present invention, the RAS of the first network may further send QoS description information of the first network to the second network, and the sent QoS description information may include: one or more of a QoS parameter, QoS class information, a data traffic type, and bandwidth information configured by the first network for the data traffic transmission. The sent QoS information may be sent together with the data traffic description information, and carried to the second network through the data traffic description information, so that the second network perform the QoS configuration of the second network with reference to the data traffic description information and the QoS description information.

In a practical application, the first network and the second network may be a home network or a similar miniaturized networking structure.

In Embodiment 1 of the present invention, when performing QoS configuration, the first network sends data traffic description information of a data traffic to be transmitted to the second network, so that the second network may perform QoS configuration of the second network according to the data traffic description information, thereby achieving remote cooperative QoS configuration between home networks; and in the embodiment of the present invention, after completing local configuration, the RAS of the first network directly returns a configuration completion response to a QoS management device of the first network without waiting for a configuration completion message returned by the second network, so that the QoS management device of the first network continues performing the QoS configuration of the first network, thereby achieving parallel QoS configuration of the first network and the second network, reducing the delay of the QoS configuration, and improving the efficiency of the QoS configuration.

Embodiment 2

Figure 2:
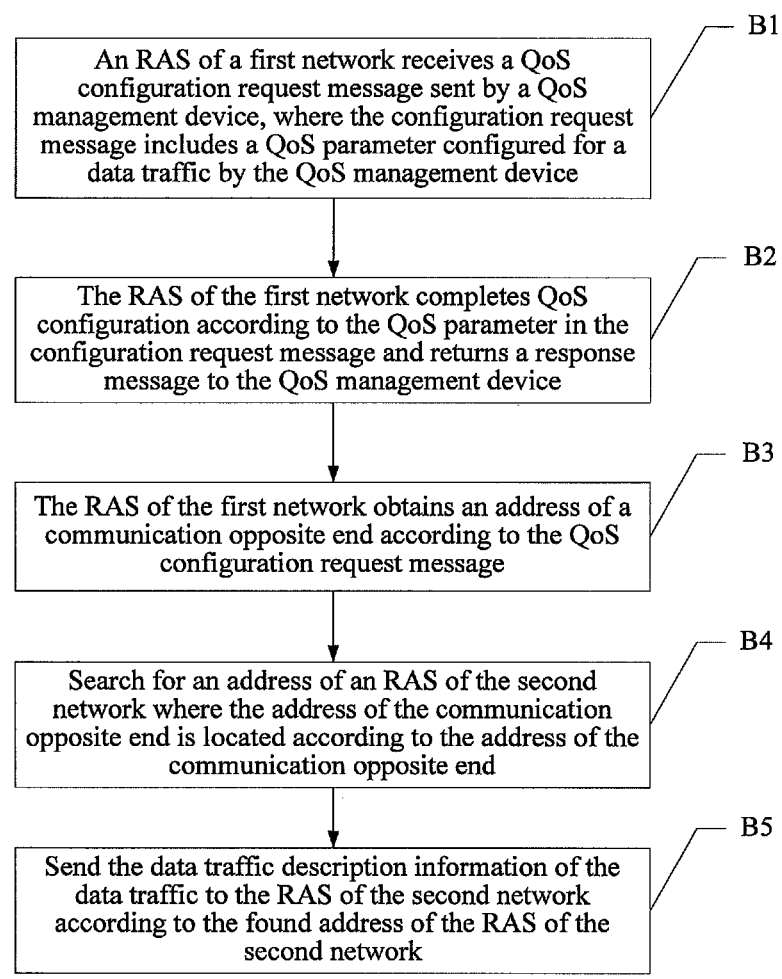
FIG. 2 is a flowchart of a method for configuring a Quality of Service parameter according to Embodiment 2 of the present invention.

A method for configuring a Quality of Service parameter, a flowchart of which is shown in FIG. 2, includes the following steps.

B1: A remote access server RAS of a first network receives a QoS configuration request message sent by a Quality of Service QoS management device, where the configuration request message includes a QoS parameter configured for a data traffic by the QoS management device.

In this embodiment, the QoS parameter specifically includes: one or more of a data traffic level, a maximum data rate, a minimum data rate, a maximum jitter, and a maximum delay. It may be understood that, the QoS parameter may further include other parameters, and the specific parameters included in the QoS parameter do not limit the present invention.

In the embodiment of the present invention, the QoS management device is configured to receive a QoS request from a control point (CP), calculate all QoS devices (QosDevice) on the path of the data traffic according to the request, and configure a QoS parameter for all the QoS devices.

B2: The RAS of the first network completes QoS configuration according to the QoS parameter in the configuration request message and returns a response message to the QoS management device.

In the embodiment of the present invention, a QosDevice may be embedded in the RAS of the first network to complete the local QoS configuration. A QoS device may be embedded in any UPnP device, such as a media server (Media Server), a media renderer (Media Renderer), or a remote access server (RAS), and the QosDevice is configured to receive a QoS configuration request of the QoS management device and implement QoS configuration of the device into which the QosDevice is embedded.

B3: The RAS of the first network obtains an address of a communication opposite end according to the QoS configuration request message.

It may be understood that, in the embodiment of the present invention, QoS configuration information delivered by the QoS configuration device includes information relevant to data traffic, such as quintuple information, and the RAS of the first network may obtain the address of the communication opposite end according to the quintuple information.

B4: Search for an address of an RAS of a second network where the address of the communication opposite end is located according to the address of the communication opposite end.

Specifically, the RAS of the first network may search a local database or list or a database or list on a network according to the address of the communication opposite end, so as to obtain the address of the remote access server of the network where the communication opposite end is located, that is, the address of the RAS of the second network.

B5: Send data traffic description information of the data traffic to the RAS of the second network according to the found address of the RAS of the second network.

Figure 3:
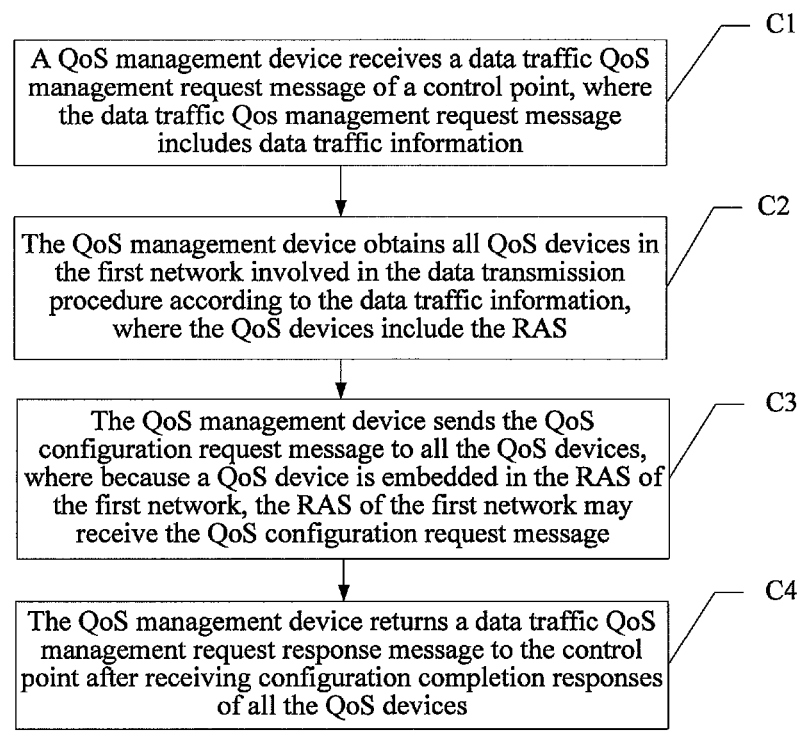
FIG. 3 is a flowchart showing that a QoS management device of a first network configures QoS of the first network in an embodiment of the present invention.

In the embodiment of the present invention, a procedure where a QoS management device of a first network configures QoS of the first network is shown in FIG. 3, and includes the following steps.

C1: The QoS management device receives a data traffic QoS management request message of a control point, where the data traffic QoS management request message includes data traffic information.

C2: The QoS management device obtains all QoS devices in the first network involved in the data transmission procedure according to the data traffic information, where the QoS devices include the remote access server RAS.

C3: The QoS management device sends the QoS configuration request message to all the QoS devices, where because a QoS device is embedded in the RAS of the first network, the RAS of the first network may receive the QoS configuration request message.

C4: The QoS management device returns a data traffic QoS management request response message to the control point after receiving configuration completion responses of all the QoS devices.

It may be understood that, in step C1, after the QoS management device receives the QoS configuration request message of the control point, the procedure further includes: requesting a QoS configuration policy from a QoS policy holding device (QosPolicyHolder) of the first network, and generating the QoS parameter in the QoS configuration request message sent to the QoS devices according to the QoS configuration policy returned by the QoS policy holding device.

Figure 4:
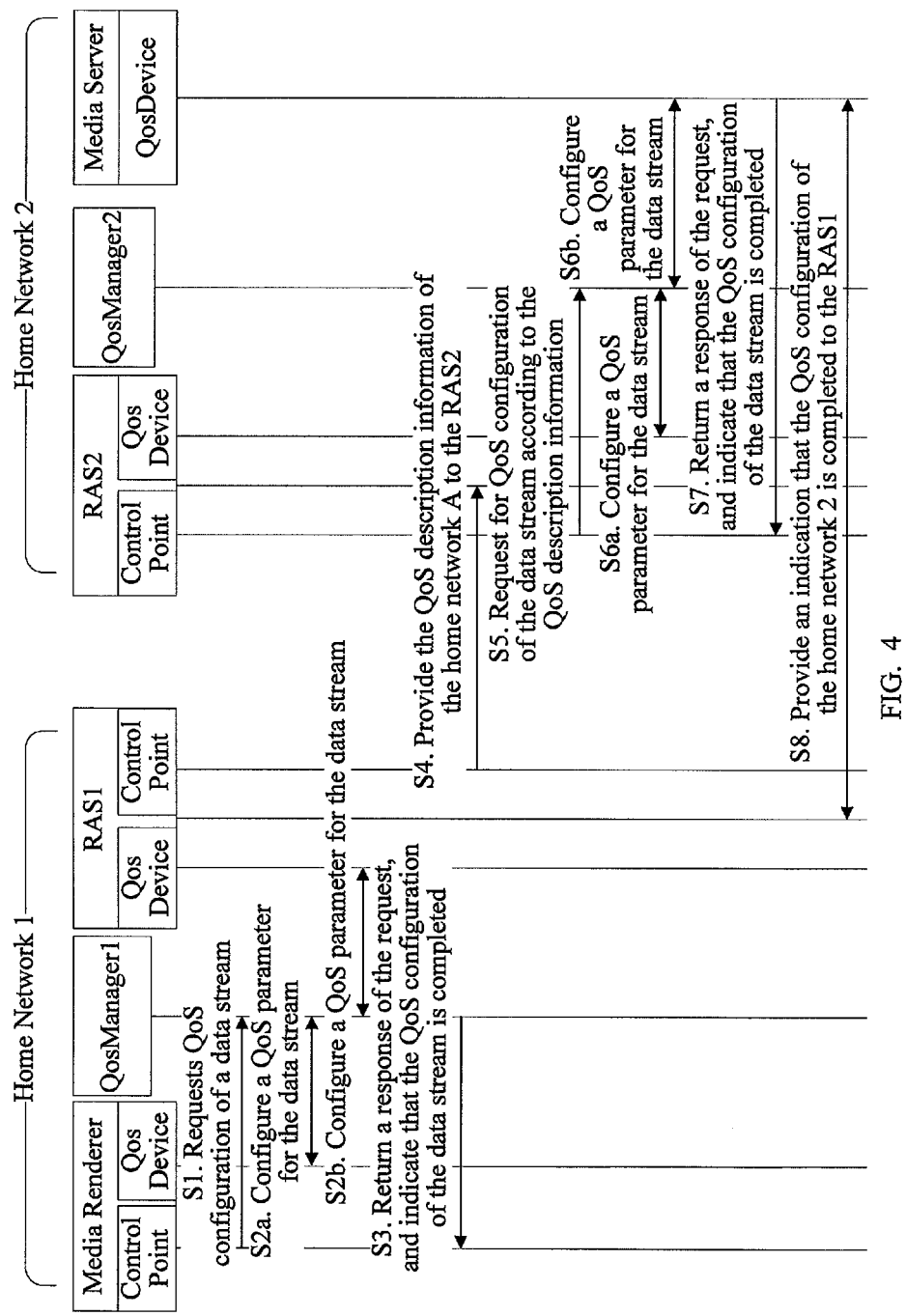
FIG. 4 is a flowchart of an application example of the present invention.

The method according to Embodiment 2 of the present invention is described in detail with reference to application example 1; in this example, the first network is a home network (Home Network) A, and the second network is a home network (Home Network) B; first, a user in the home network A discovers a media server (Media Server, MS) in the home network B through a CP, obtains a media file of interest from the media server, and intends to play the media file on a local media renderer (Media Renderer, MR). In order to achieve a high media transmission speed so as to play the media traffic fluently, the user may apply for setting QoS for the traffic from the MS to the MR, and specifically, a flowchart for performing QoS configuration is shown in FIG. 4.

The specific process includes the following steps.

Step S1: A user requests a QoS management device (QosManager) in a local network for QoS configuration through a CP embedded in a media renderer (Media Renderer). In this application example, the CP and the QosDevice are embedded in the media renderer, where the CP is resident in the local network.

Specifically, a data traffic QoS management request message (RequestTrafficQos) is sent to the QoSManager, and main parameters carried in the data traffic QoS management request message are data traffic description information and requested Qos class/bandwidth or similar information.

It may be understood that, before step S1 in this application example, the process includes: a remote access establishment stage, where a virtual private network (Virtual Private Network, VPN) is established between the home network A and the home network B, and may be specifically achieved by using technologies such as internet protocol security (Internet Protocol Security, IPSec) or a transport layer security protocol (Transport Layer Security, TLS), and both the home network A and the home network B provide an exposable local UPnP device to an RAS of an opposite party according to user configuration. For example, the home network A exposes the MR in A to the home network B according to an access policy; the home network B exposes the MS in B to the home network A according to the access policy. The "exposing" manner is to send information of a home network device to be exposed, such as a device description document address (Device Description Document URL, DDD URL), to the RAS of the opposite end through a UPnP command (action), and in this way the exposed device may be discovered and used by a CP of the opposite network.

Step S2a and step S2b: After receiving the request sent by the user, the QoSManager discovers all QosDevices on the traffic path according to address information relevant to the data traffic in the QoS configuration information, and configures a QoS parameter for the QosDevice transmitting the data traffic according to information such as the data traffic description information and the requested level/bandwidth.

In this step, because the QoS device (QosDevice) in the home network B is invisible to the QoSManager in the home network A, the QoSManager can only configure QosDevices in the local network in the path of the traffic, which are QosDevices embedded in the MR and the RAS in the figure. The manner where the QoSManager configures the QosDevice is to send a data traffic QoS setup (SetupTrafficQos) message or a data traffic QoS admission (AdmitTrafficQos) message to the QosDevice.

The QosDevice receives the QoS configuration request message sent by the QoSManager, completes the QoS configuration according to the configuration request message of the QoSManager, and returns a response message responding to the QoS configuration request.

Step S3: After receiving responses returned by all QosDevices configured by the QoSManager, the QoSManager returns a response to the RequestTrafficQos to the CP1 initiating the media traffic QoS management request message. The QoS configuration of the home network A is completed.

Step S4: After step S2, after receiving the configuration request message sent by the QoSManager and completing the configuration, the RAS in the home network A sends a QoS configuration request message to the RAS of the second network, where the message may carry the QoS description information and the data traffic description information of the home network A; the content of the QoS description information may be all QoS parameters configured in the home network A, and may also be other parameters which may describe the QoS configured by the home network A, such as the bandwidth, the Qos class, and the data traffic type. Because it is very difficult for the two networks to configure completely the same QoS based on network properties and the configuration of network capabilities, in the embodiment of the present invention, all QoS configured by the first network may not be sent to the second network, and a manner of sending a part of key QoS information (which can reflect main information of the QoS configuration of the first network) is adopted, so that the second network may select a QoS parameter as close as possible to complete the QoS configuration of the second network according to the QoS configuration of the first network.

In this embodiment, the data traffic description sent from the home network A to the home network B may be different from the data traffic description information in the QoS configuration request message sent by the QoS management device in step S2, and content may be appropriately added or eliminated; the main function of the data traffic description information sent from home network A to the home network B is to notify the home network B of performing QoS configuration, and the data traffic description information may enable the home network B to know a transmission procedure of a data traffic for which QoS is configured.

In this embodiment, a QosDevice and a control point 2 (CP2) are embedded in an RAS1, and the CP2 obtains the data traffic description information from the QosDevice embedded in the RAS1 and sends all or a part of information of the parameter to an RAS2 in the home network B.

Step S5: The CP (CP3) embedded in the RAS2 reads the data traffic description information and the QoS description information received by the RAS2, and sends a QoS configuration request (for example, a request traffic QoS (RequestTrafficQos) message) to the QoSManager in the home network B, so as to begin the QoS configuration of the home network B. The function of the CP3 in subsequent steps is the same as that of the CP1.

Step S6a and step S6b: After receiving the QoS configuration request, the QoSManager of the home network B discovers all QosDevices on the traffic path according to address information relevant to the data traffic in the data traffic description information in the QoS configuration information, and configures a QoS parameter for the foregoing QosDevice transmitting the data traffic according to information such as the data traffic description information and the requested class/bandwidth.

Step S7: After all QoS configuration is completed, the QoS management device returns a response to the request to the CP embedded in the RAS2, so as to indicate that the QoS configuration of the data traffic is completed.

Optionally, the present invention may further include: step S8, where after receiving the response, the CP in the RAS2 notifies the RAS1 of the information that the QoS configuration of the home network B is also completed.

Thereby, the QoS configuration of the two home networks is completed. Subsequently, the user may play a media file from the MS on the MR, and the media are transmitted through the previously configured QoS in the home network A and the home network B.

Figure 5:
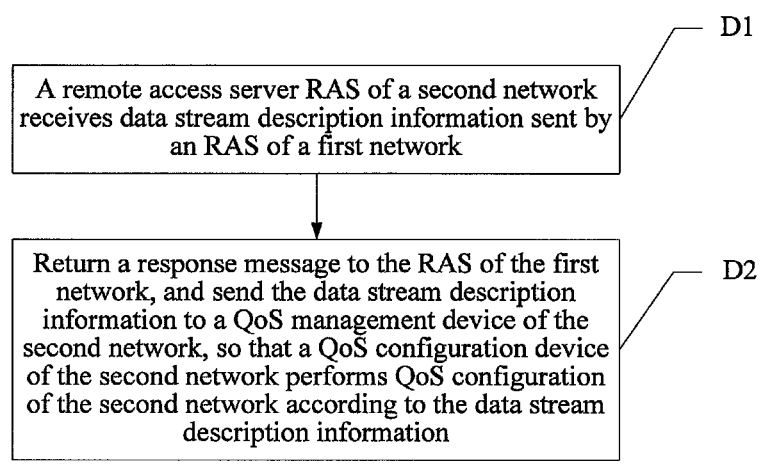
FIG. 5 is a flowchart of a method for configuring a Quality of Service parameter according to Embodiment 3 of the present invention.

Further, according to the solution of application example 1, a specific implementation is considered. In this embodiment, a QoS policy holding device (QosPolicyHolder) may be further added, a schematic systematic structural diagram of which is shown in FIG. 5.

After the QosPolicyHolder is added, before configuring respective QosDevices, the QoSManager in the home network A and/or the QoSManager in the home network B need to request a QoS policy from the QosPolicyHolder. A manner of requesting the QoS policy is to send a policy request message (GetTrafficPolicy), where a parameter TrafficDescriptor is carried, and the QosPolicyHolder returns a configuration policy (TrafficPolicy) for the media traffic to the QoSManager according to a policy preset by the user.

In this embodiment, the procedure where the RAS of the first network sends the data traffic description information to the RAS of the second network may be as follows: the RAS of the first network sends the data traffic description to a remote access discovery agent synchronization service (Remote Access Discovery Agent Synchronization, RADASync) module (existing service) in the home network B through the internally integrated control point 2 (CP2) and through a message of the UPnP protocol, where the module is configured to aggregate information of all remote devices.

Accordingly, a message of the UPnP protocol, a remote traffic QoS adding (AddRemoteTrafficQoS) message is defined, and parameters included in the message are described in detail in the following Table 1 and illustration.

TABLE 1

| Argument | Direction | relatedStateVariable |
|---|---|---|
| RemoteTrafficDescriptor | IN | A_ARG_TYPE_TrafficDescriptor |
| TrafficHandle | IN | A_ARG_TYPE_TrafficHandle |

Remote traffic description message (RemoteTrafficDescriptor), being a parameter carried in the command request message. In fact, the parameter is all or a part of information of the parameter TrafficDescriptor obtained by the CP2 through the QosDevice in the RAS1.

Traffic identification message (TrafficHandle), being a parameter carried in the command request message. The parameter is used to uniquely identify QoS of the media traffic about the request in the home network A.

In this embodiment, a control point 3 (CP3) integrated in the RAS of the second network is responsible for initiating the QoS configuration of the home network B, and after obtaining a result, sending the information indicating completion of the QoS configuration to the RADASync service in the home network A through the UPnP message, so as to indicate that the QoS configuration of the home network B is completed.

Accordingly, a UPnP command, a remote data traffic confirming message (ConfirmRemoteTrafficQoS), is defined, and parameters included in the message are shown in the following Table 2 in detail.

TABLE 2

| Argument | Direction | relatedStateVariable |
|---|---|---|
| TrafficHandle | IN | A_ARG_TYPE_TrafficHandle |
| NewTrafficHandle | IN | A_ARG_TYPE_TrafficHandle |

TrafficHandle: used to uniquely identify QoS of the media traffic about the request in the home network A, and in fact, being the TrafficHandle sent to the RAS2 by the CP2 through the AddRemoteTrafficQoS, and used to indicate that the completed QoS configuration in the home network B is corresponding to a media traffic identified by the TrafficHandle.

NewTrafficHandle: used to uniquely identify QoS of the media traffic about the request in the home network B, and in fact, being a unique identifier generated by the QoSManager for the QoS after the CP3 initiates the QoS configuration of the home network B.

Embodiment 3

A method for configuring a Quality of Service parameter, a process of which is shown in FIG. 5, includes the following steps.

D1: A remote access server RAS of a second network receives data traffic description information sent by an RAS of a first network.

D2: Return a response message to the RAS of the first network, and send the data traffic description information to a QoS management device of the second network, so that a QoS configuration device of the second network performs QoS configuration of the second network according to the data traffic description information.

This embodiment may further include: sending, by the RAS of the second network, QoS description information of the first network to the QoS management device of the second network, where the QoS description information includes: one or more of a QoS parameter, Qos class information, a data traffic type, and bandwidth information configured by the first network for the data traffic transmission; and the QoS configuration device of the second network is specifically configured to perform the QoS configuration of the second network according to the data traffic description information and the QoS description information.

In Embodiment 3 of the present invention, when the first network and the second network perform cooperative QoS configuration, the second network receives the data traffic description information sent by the first network, and directly returns a response message, to instruct the first network to continue performing the QoS configuration, so that the first network may continue subsequent operations of configuring QoS of this network without waiting for the completion of the QoS configuration of the second network, thereby achieving parallel QoS configuration of the first network and the second network, reducing the delay of the QoS configuration, and improving the efficiency of the QoS configuration.

Persons of ordinary skill in the art may understand that all or part of the steps of the method according to the embodiments of the present invention may be implemented by a program instructing relevant hardware. The program may be stored in a computer readable storage medium. The storage medium may be a Read-Only Memory (ROM) or a Random Access Memory (RAM), a magnetic disk, or an optical disk.

Embodiment 4

Figure 6:
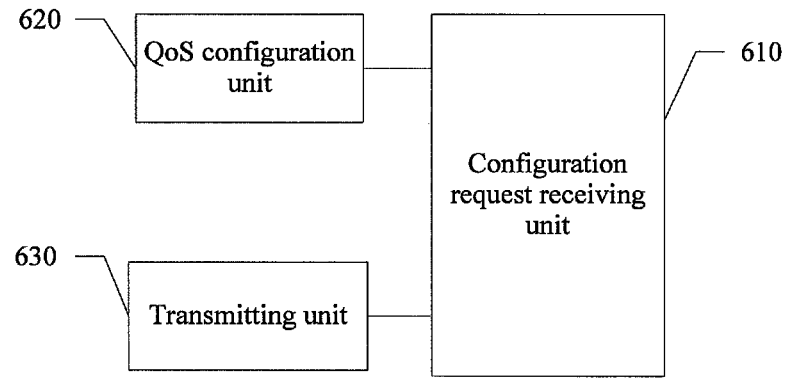
FIG. 6 is a schematic structural diagram of a remote access server according to Embodiment 4 of the present invention.

A remote access server, a schematic structural diagram of which is shown in FIG. 6, includes:

a configuration request receiving unit 610, configured to receive a QoS configuration request message sent by a Quality of Service QoS management device, where the QoS configuration request message includes a QoS parameter configured for a data traffic by the QoS management device;

a QoS configuration unit 620, configured to complete local QoS configuration according to the QoS parameter in the QoS configuration request message and return a response message to the QoS management device; and a transmitting unit 630, configured to send data traffic description information of the data traffic to a second network according to the QoS configuration request message received by the configuration request receiving unit 610, so that the second network performs QoS configuration of the second network with reference to the data traffic description information.

It may be understood that, in this embodiment, the transmitting unit 630 may be specifically configured to obtain an address of a communication opposite end in the QoS configuration request message, and search for an address of the RAS of the second network where the address of the communication opposite end is located according to the address of the communication opposite end; and send the data traffic description information of the data traffic to the RAS of the second network according to the found address of the RAS of the second network.

Embodiment 5

Figure 7:
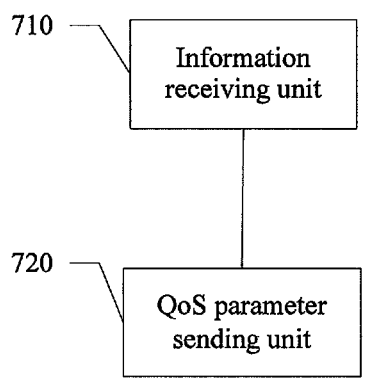
FIG. 7 is a schematic structural diagram of a remote access server according to Embodiment 5 of the present invention.

A remote access server, a schematic structural diagram of which is shown in FIG. 7, includes:

an information receiving unit 710, configured to receive data traffic description information sent by an RAS of a first network; and a QoS parameter sending unit 720, configured to return a response message to the RAS of the first network, and send the data traffic description information to a QoS configuration device of a second network, so that the QoS configuration device of the second network performs QoS configuration of the second network according to the data traffic description information.

Embodiment 6

Figure 8:
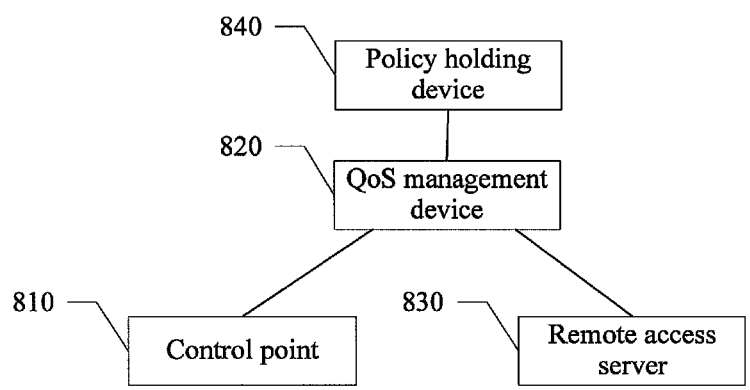
FIG. 8 is a schematic structural diagram of a system for configuring a Quality of Service parameter according to Embodiment 6 of the present invention.

A system for configuring a Quality of Service parameter, a schematic structural diagram of which is shown in FIG. 8, includes:

a control point 810, configured to receive user control, and send a data traffic QoS management request to a QoS management device;

the QoS management device 820, configured to receive a data traffic QoS management request message of the control point, where the data traffic QoS management request message includes data traffic description information of a transmitted data traffic; obtain all QoS devices in the first network involved in the data traffic transmission procedure according to the data traffic description information, and send a QoS configuration request to all the QoS devices, where the QoS devices include a remote access server RAS; and return a data traffic QoS management request response message to the control point after receiving configuration completion responses of all the QoS devices; and the remote access server 830, configured to receive a QoS configuration request message sent by the Quality of Service QoS management device, where the QoS configuration request message includes a QoS parameter configured for a data traffic by the QoS management device; complete QoS configuration according to the QoS parameter in the configuration request message and return a response message to the QoS management device; and send data traffic description information of the data traffic to a second network according to the QoS configuration request message, so that the second network performs QoS configuration of the second network with reference to the data traffic description information.

The system for configuring a Quality of Service parameter according to this embodiment may further include: a policy holding device 840, configured to save a preset QoS configuration policy; the QoS management device 820 is further configured to request a QoS configuration policy from the QoS policy holding device of the first network, and generate the QoS parameter in the QoS configuration request message sent to the QoS device according to the QoS configuration policy returned by the QoS policy holding device.

The method which the remote access server according to Embodiment 3 of the present invention and the system for configuring a Quality of Service parameter according to Embodiment 4 may run refer to the description of the foregoing method embodiment, and herein is not repeated again.

The method, the remote access server and the system for configuring a remote access server parameter according to the embodiments of the present invention are introduced in detail in the foregoing, and specific examples are applied herein to set forth the principle and the implementation of the present invention, and the foregoing illustration of the embodiments is only intended to help in understanding the method and the core idea of the present invention. Meanwhile, persons having ordinary skill in the art can make variations and modifications to the present invention in terms of the specific implementations and application scopes according to the ideas of the present invention. Therefore, the specification shall not be construed as limitations to the present invention.

What is claimed is:

1. A method for configuring a Quality of Service (QoS) parameter, comprising:

receiving, by a remote access server (RAS) of a first network, of a QoS configuration request message sent by a QoS management device, wherein the QoS configuration request message comprises a QoS parameter configured for a data traffic by the QoS management device;

completing, by the RAS of the first network, QoS configuration according to the QoS parameter in the configuration request message and directly returning a response message to the QoS management device without waiting for a configuration completion message returned by a second network; and sending, by the RAS of the first network, data traffic description information of the data traffic to the second network according to the QoS configuration request message, to enable the second network to perform QoS configuration of the second network with reference to the data traffic description information.

2. The method according to claim 1, wherein sending the data traffic description information of the data traffic to the second network comprises:

obtaining, by the RAS of the first network, an address of a communication opposite end according to the QoS configuration request message;

searching for an address of an RAS of the second network according to the address of the communication opposite end, which is located in the second network; and sending the data traffic description information to the RAS of the second network according to the address of the RAS of the second network.

3. The method according to claim 1, wherein the QoS parameter comprises:

one or more of a data traffic level, a maximum data rate, a minimum data rate, a maximum jitter, and a maximum delay.

4. The method according to claim 1, wherein the data traffic description information comprises: one or more of a source address, a destination address, a source port, a destination port, a protocol number, a data traffic type, and bandwidth information.

5. The method according to claim 1, further comprising:

sending, by the RAS of the first network, QoS description information of the first network to the second network, to enable the second network to perform the QoS configuration of the second network with reference to the data traffic description information and the QoS description information, wherein the sent QoS description information comprises: one or more of a QoS parameter, QoS class information, a data traffic type, and bandwidth information configured by the first network for data traffic transmission.

6. The method according to claim 2, further comprising:

sending, by the RAS of the first network, QoS description information of the first network to the second network, to enable the second network to perform the QoS configuration of the second network with reference to the data traffic description information and the QoS description information, wherein the sent QoS description information comprises: one or more of a QoS parameter, QoS class information, a data traffic type, and bandwidth information configured by the first network for data traffic transmission.

7. The method according to claim 1, wherein before the receiving, by the RAS of the first network, of the QoS configuration request message sent by the QoS management device, the method comprises:

receiving, by the QoS management device, a data traffic QoS management request message of a control point, wherein the data traffic QoS management request message comprises data traffic information;
obtaining, by the QoS management device, all QoS devices in the first network involved in a data transmission procedure according to the data traffic information, wherein the QoS devices comprise the RAS; and
sending, by the QoS management device, the QoS configuration request message to all the QoS devices; and
the method further comprises: returning, by the QoS management device, a data traffic QoS management request response message to the control point after receiving configuration completion responses of all the QoS devices.

8. The method according to claim 2, wherein before the receiving, by the RAS of the first network, of the QoS configuration request message sent by the QoS management device, the method comprises:
receiving, by the QoS management device, a data traffic QoS management request message of a control point, wherein the data traffic QoS management request message comprises data traffic information;
obtaining, by the QoS management device, all QoS devices in the first network involved in the data transmission procedure according to the data traffic information, wherein the QoS devices comprise the RAS; and
sending, by the QoS management device, the QoS configuration request message to all the QoS devices; and
the method further comprises: returning, by the QoS management device, a data traffic QoS management request response message to the control point after receiving configuration completion responses of all the QoS devices.

9. The method according to claim 5, wherein before the receiving, by the RAS of the first network, of the QoS configuration request message sent by the QoS management device, the method comprises:
receiving, by the QoS management device, a data traffic QoS management request message of a control point, wherein the data traffic QoS management request message comprises data traffic information;
obtaining, by the QoS management device, all QoS devices in the first network involved in the data transmission procedure according to the data traffic information, wherein the QoS devices comprise the RAS; and
sending, by the QoS management device, the QoS configuration request message to all the QoS devices; and
the method further comprises: returning, by the QoS management device, a data traffic QoS management request response message to the control point after receiving configuration completion responses of all the QoS devices.

10. The method according to claim 6, wherein before the receiving, by the RAS of the first network, of the QoS configuration request message sent by the QoS management device, the method comprises:
receiving, by the QoS management device, a data traffic QoS management request message of a control point, wherein the data traffic QoS management request message comprises data traffic information;
obtaining, by the QoS management device, all QoS devices in the first network involved in the data transmission procedure according to the data traffic information, wherein the QoS devices comprise the RAS; and
sending, by the QoS management device, the QoS configuration request message to all the QoS devices; and
the method further comprises: returning, by the QoS management device, a data traffic QoS management request response message to the control point after receiving configuration completion responses of all the QoS devices.

11. The method according to claim 7, wherein after the receiving, by the QoS management device, the data traffic QoS management request message of the control point, the method further comprises: requesting a QoS configuration policy from a QoS policy holding device of the first network, and generating the QoS parameter in the QoS configuration request message sent to the QoS devices according to the QoS configuration policy returned by the QoS policy holding device.

12. The method according to claim 8, wherein after the receiving, by the QoS management device, the data traffic QoS management request message of the control point, the method further comprises: requesting a QoS configuration policy from a QoS policy holding device of the first network, and generating the QoS parameter in the QoS configuration request message sent to the QoS devices according to the QoS configuration policy returned by the QoS policy holding device.

13. The method according to claim 9, wherein after the receiving, by the QoS management device, the data traffic QoS management request message of the control point, the method further comprises: requesting a QoS configuration policy from a QoS policy holding device of the first network, and generating the QoS parameter in the QoS configuration request message sent to the QoS devices according to the QoS configuration policy returned by the QoS policy holding device.

14. A remote access server, comprising:
a receiver, configured to receive a Quality of Service (QoS) configuration request message sent by a QoS management device, wherein the configuration request message comprises a QoS parameter configured for a data traffic by the QoS management device;
a processor, configured to complete local QoS configuration according to the QoS parameter in the QoS configuration request message; and
a transmitter, configured to directly return a response message to the QoS management device without waiting for a configuration completion message returned by a second network, and send data traffic description information of the data traffic to the second network according to the QoS configuration request message received by the configuration request receiving unit, to enable the second network to perform QoS configuration of the second network with reference to the data traffic description information.

15. The remote access server according to claim 14, wherein the processor is further configured to obtain an address of a communication opposite end in the QoS configuration request message, and search for an address of the RAS of the second network according to the address of the communication opposite end which is located in the second network; and send the data traffic description information of the data traffic to the RAS of the second network according to the found address of the RAS of the second network.

16. A system for configuring a Quality of Service (QoS) parameter, comprising:
a control point, configured to receive user control, and send a data traffic QoS management request to a QoS management device;
the QoS management device, configured to receive a data traffic QoS management request message of the control point, wherein the data traffic QoS management request message comprises data traffic description information of a transmitted data traffic; obtain all QoS devices in the first network involved in a data traffic transmission procedure according to the data traffic description information, and send a QoS configuration request to all the QoS devices, wherein the QoS devices comprise a remote access server (RAS); and return a data traffic QoS management request response message to the control point after receiving configuration completion responses of all the QoS devices; and the remote access server, configured to receive a QoS configuration request message sent by the QoS management device, wherein the QoS configuration request message comprises a QoS parameter configured for a data traffic by the QoS management device; complete QoS configuration according to the QoS parameter in the configuration request message and return a response message to the QoS management device; and send data traffic description information of the data traffic to a second network according to the QoS configuration request message, to enable the second network to perform QoS configuration of the second network with reference to the data traffic description information.

17. The system according to claim 16, further comprising: a policy holding device, configured to save a preset QoS configuration policy, wherein the QoS management device is further configured to request a QoS configuration policy from the policy holding device of the first network, and generate the QoS parameter in the QoS configuration request message sent to the QoS devices according to the QoS configuration policy returned by the policy holding device.

* * * * *